March 23, 1971    H. S. BUTLER, JR., ET AL    3,572,093
THERMAL TESTING INSTRUMENT
Filed July 7, 1969    3 Sheets-Sheet 1

Harold S. Butler, Jr.
Roger K. Johnson
Robert H. Payne, Jr.
INVENTORS

BY

Don D. Doty
Attorney

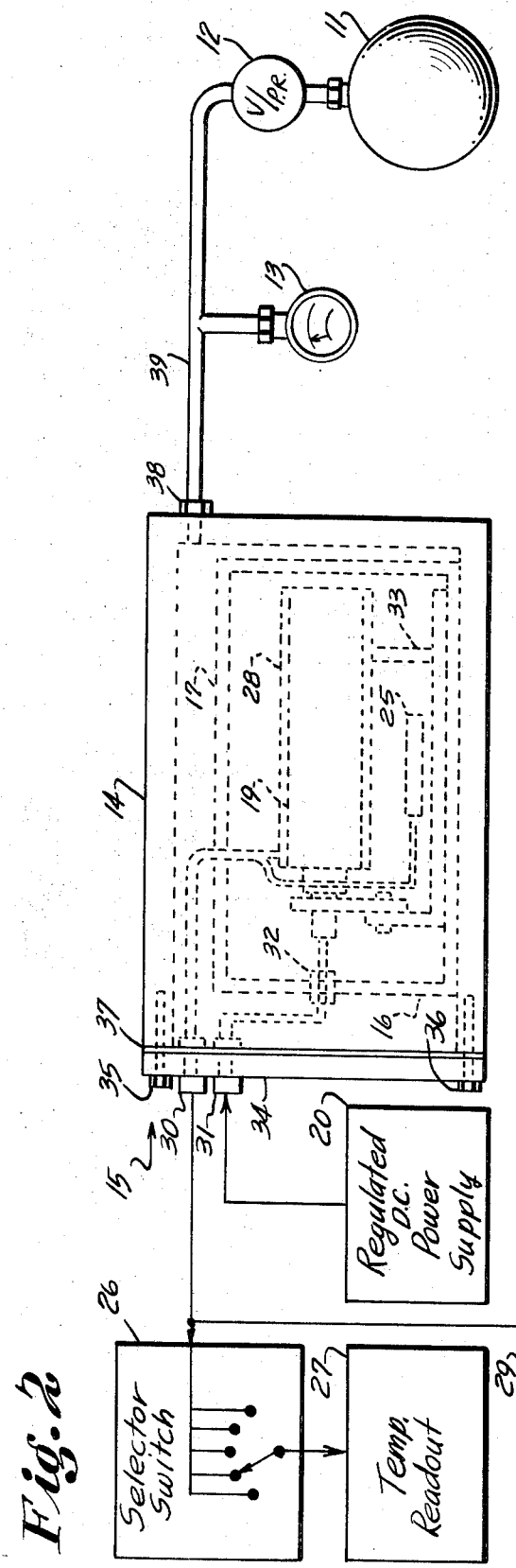

Harold S. Butler, Jr.
Roger K. Johnson
Robert H. Payne, Jr.
INVENTORS

BY

Dox D. Doty
Attorney

United States Patent Office 3,572,093
Patented Mar. 23, 1971

3,572,093
THERMAL TESTING INSTRUMENT
Harold S. Butler, Jr., Panama City, Roger K. Johnson, Lynn Haven, and Robert H. Payne, Jr., Panama City, Fla., assignors to the United States of America as represented by the Secretary of the Navy
Filed July 7, 1969, Ser. No. 839,443
Int. Cl. G01n 25/16
U.S. Cl. 73—15
11 Claims

ABSTRACT OF THE DISCLOSURE

This invention is an instrument for measuring the thermal conductance of a material while it is located within a simulated water environment of various depths and pressures. A heater heats one side of said material to a temperature approximately human body heat. Said heater and material are submerged in a tray of ice water located in a pressure tight housing. Gas under controlled pressure conditions is used to pressurize the inside of said housing and, thus, apply water depth simulating pressures to both sides of said wetted material, so as to effect compression thereof in proportion thereto. While compressed temperature readings are taken with thermocouples located on the heater side of said material which effectively indicate the body heat loss therethrough to said ice water. The heat loss, if any, is proportional to the thermal conductance of the material at any given depth simulating pressure.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The present invention relates generally to measuring and testing instruments and, in particular, is a method and means for determining the thermal conductance of a material which is disposed within an underwater environment of different depths. In even greater particularity, it is an improved instrument for measuring the warmth of materials used in the specialized protective suits of deep sea divers and swimmers and any other whose operational ambient environment is hostile to the human body from a temperature and/or pressure standpoint.

Although this invention is, as suggested above, primarily intended to be specifically applicable to the testing of materials for divers and swimmers protective suits, it may also be used for measuring the thermal conductance of any and all materials wherein ambient pressure and aqueous or moisture conditions are factors to take into consideration. However, in order to keep the disclosure thereof as brief and simple as possible—but without limiting it thereto—the preferred embodiment disclosed herein will be oriented toward an improved method and means of determining the thermal conductance of materials incorporated in swimmer-diver wet suits.

It is obvious that when a swimmer or marine diver enters the water, his environment becomes hostile to him. Furthermore, if the water is sufficiently cold, it could be sufficiently hostile to be fatal, unless the diver is protected by means of a special suit designed for such purpose. Among other things, the prevention of undue body heat loss thus becomes a major factor to consider when selecting materials for making wet suits. In many instances, it is necessary for divers to be in all kinds of water near freezing temperatures and perhaps at great depths for extended periods of time and, therefore, said wet suits—the most suitable protection known, to date—become the limiting factors in accomplishing such operations as easily and expeditiously as possible.

As a general rule, wet suits are made to order for deep sea divers, so that the measurements thereof are optimum for each diver. This results in a close fitting suit which permits entrance of only a small amount of water, and this water is rapidly warmed by the driver's body. Thus, a heat reservoir, so to speak, is maintained inside the wet suit, which facilitates both action and movement of the diver for most practical purposes, as well as provides him with as much comfort as possible under the circumstances. In addition, however, the body heat loss is contingent on the insulating properties of the material of which the suit is made.

It has been found that materials which are flexible and contain minuscule gas or fluid cells have the best heat insulation properties. For example, foam neoprene, foam rubber, or the like, have been determined to provide protection against cold water in many instances. On the other hand, it has been determined that they become less effective as insulators as they are compressed by ambient pressure, such as is experienced as the water depth is increased. Under such circumstances, if the depth or pressure is great enough, foamed neoprene, for instance, becomes about as effective for insulative purposes as a thin sheet of solid neoprene. Unfortunately, that is not good enough for diver safety at many working depths; so in order to insure that the suit he is wearing provides adequate protection, the material thereof must be tested prior to suit manufacture, as well as from time to time during normal service thereof.

Heretofore, there has been very little information on the thermal insulating properties of wet suit materials when they are under pressure. Most available data have been obtained by approximating the thermal properties of an uncompressed sample of a thickness substantially equivalent to that of a compressed sample thereof, and by accepting the subjective opinions of personnel wearing wet suits made of such material. Also, the heat transfer of a given material has, on occasion, been determined by taking temperature measurements on both sides thereof while applying heat to one side thereof and pressure to both sides thereof. Although satisfactory for many purposes the results have not been accurate enough to safety predict how materials thusly tested will insulate in a wet suit made thereof.

SUMMARY OF THE INVENTION

The present invention overcomes many of the disadvantages of the known prior art method and means for testing wet suit materials because it makes it possible to test the thermal conductance thereof under a variety of simulated working conditions. Accordingly, it is a test instrument which facilitates the design and selection of such materials prior to the construction of the protective suits, and it safely and efficiently tests the operability of said suits during the service life thereof, without having to go into the actual working environment to do so.

It is, therefore, an object of this invention to provide an improved method and means for testing the thermal conductance of materials at various ambient pressures.

Another object of this invention is to provide a method and means for testing the heat insulation properties of materials to determine whether or not they meet required specifications both prior to an after construction of things made thereof.

A further object of this invention is to provide an instrument which tests the thermal conductance of wet suits within an environment that simulates the actual working or service environment thereof.

Still another object of this invention is to provide an efficient, economical, and safe method and means for determining the serviceability of wet suits, without being exposed to the hazards of descending to the deep ocean to do so.

Another object of this invention is to reduce the time and effort required for testing wet suits for operability, wet suit materials, and other materials exposed to various temperatures and pressures, including hydrostatic pressures.

Another object of this invention is to provide an improved method and means for measuring the heat transfer and insulation properties of compressible "foamed" materials—such as, for example, foamed neoprene, foamed rubber, foamed cellulose, foamed plastic, and the like—which contain trapped air, gas, or fluid bubbles at various pressurized environments, including aqueous and subaqueous ones.

Still another object of this invention is to provide an improved method and means for determining the deterioration of a material, including that of a wet suit for swimmer-divers.

Another object of this invention is to provide an improved material testing instrument which is easily, economically, and safely manufactured, operated, and maintained.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 1 is a functional block diagram of the system constituting this invention;

FIG. 2 is a combination block diagram, elevational view, and quasi-pictorial view of the system of FIG. 1;

FIG. 4 is a detailed cross-sectional view and block diagram of the thermocouple arrangement, as it is incorporated in the outer wall of the heater assembly of FIG. 3; and FIG. 5 is a graphical representation of the results of testing several wet suit materials in the subject invention.

DESCRIPTION OF THE PREFERRED EMBODIMENT

Figure 3:
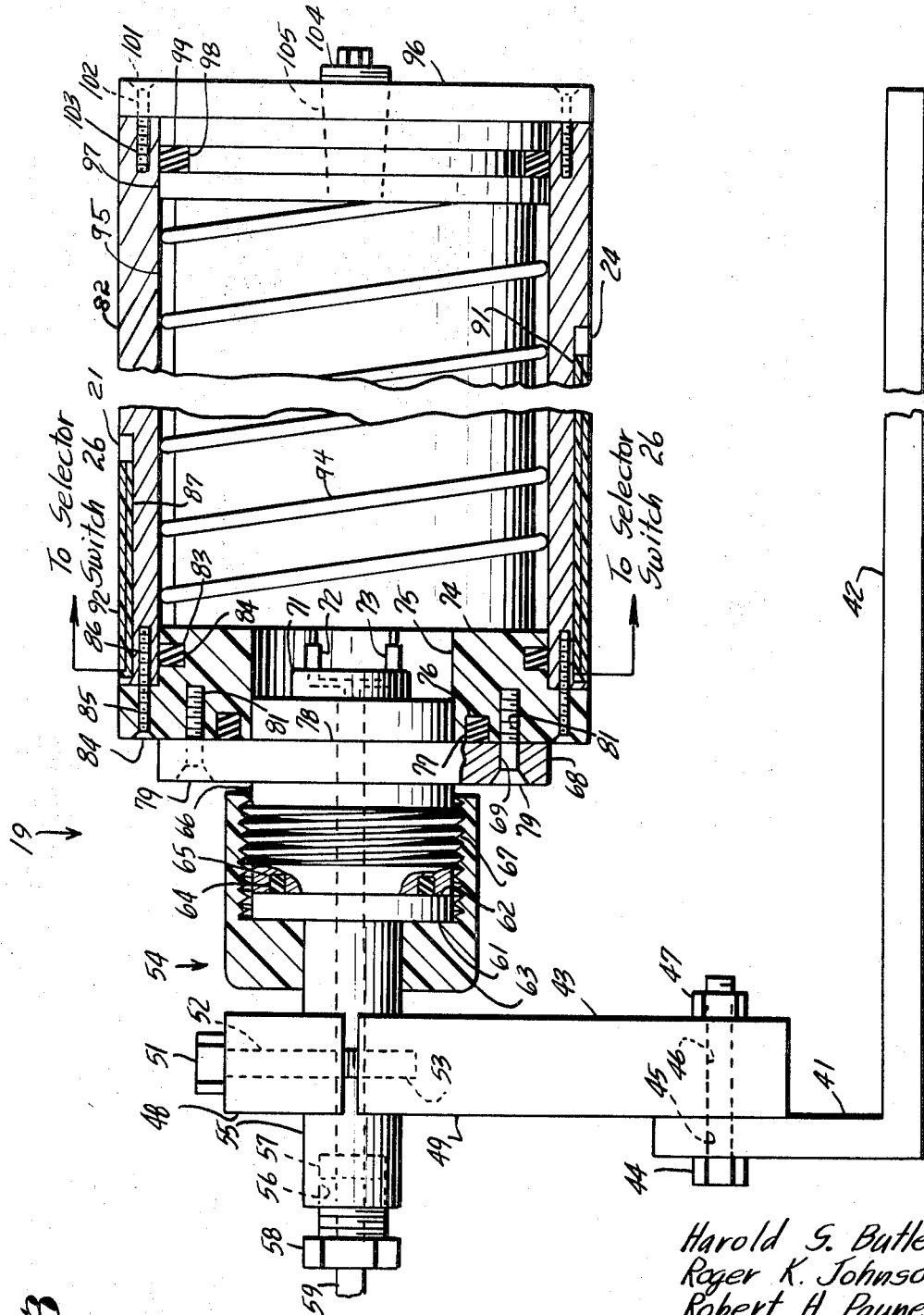
FIG. 3 is a mechanical drawing, in elevation, partly in cross-section, and partly in schematic, which illustrates the heater assembly portion of the subject invention.

Referring now to FIGS. 1 and 2, the general system constituting the invention is shown as having a pressurized gas supply 11, the output of which is connected to an adjustable pressure regulator valve 12, with the output thereof, in turn, connected to a pressure gauge 13 and to the input of a pressure tight housing 14 of a test chamber 15.

Disposed within housing 14 is a tray 16 which is open at the upper end 17 and contains sufficient ice water 18 to constitute an ice water bath. Submerged within ice water 18 is a heater assembly 19 which is connected to the output of an adjustable direct current power supply 20 for the energization thereof. Heater assembly 19 contains a plurality of thermocouples 21 through 24 effectively attached to the outer surface thereof in such manner that they sense the temperature thereof.

At this time, it would appear to be noteworthy that for the sake of simplicity of disclosure only four thermocouples are shown as being associated with heater assembly 19; however, it should be understood that any number may be used, and, moreover, they may be respectively located at any and all places thereon which would facilitate accurately measuring the temperature thereof during any given operational or test circumstances.

Another thermocouple 25 is disposed within ice water 18 within tray 16.

The outputs of thermocouples 21 through 25 are connected to respective inputs of a selector switch 26. Selector switch 26 should be so designed that any one, any number, or any combination of the temperature indications from thermocouples 21 through 25 may be selected and supplied to the output thereof. So doing, of course, merely constitutes making of design choices which would be well within the purview of one skilled in the art having the benefit of the teachings presented herewith. The output of selector switch 26 is connected to the input of a suitable temperature readout 27, which may be calibrated in accordance with the needs of the human operator during any given operational circumstances.

As will be discussed in greater detail below, any material 28 being tested for thermal conductance characteristics is wrapped around heater assembly 19 and its thermocouples 21 through 24 in such manner that there is substantially no heat loss other than that which is transferred therethrough. To achieve such end, it may be configured or wrapped therearound to conform with the external shape of said heater assembly and fit rather snugly against it. Of course, for maximum efficiency and accuracy, both the material and the heater assembly may be configured to be complementary in shape, or in the event some particular portion of a wet suit or other device is being tested, the heater assembly may be structurally configured to make its outside shape be complementary with the inside shape thereof. So doing, of course, would be merely a matter of design choice for the artisans constructing and using the invention.

A computer and readout 29 may optionally be connected to the outputs of the aforesaid thermocouples 21 through 25 for the making of various and sundry calculations which will be discussed in detail subsequently.

With the exception of heater assembly 19, which will be discussed below, it should be understood that all the elements of the subject system are conventional and well known, per se; therefore, it is their unique interconnections and interactions with said heater assembly 19 which constitutes the new combination of elements making up the subject invention and effects the new and improved results produced thereby.

Although identical reference numerals are used throughout this case for identical elements of the invention, some numbers are not shown in all figures of the drawing, in order to prevent undue complication thereof. Hence, for example, FIG. 2 omits some reference numerals depicted in FIG. 1 and adds a few not used therein and vice versa.

In view of the foregoing, it may readily be seen from FIG. 2 that a plurality of packing glands 30 and 31 extend through the wall of housing 14 in such manner that the electrical conductors from thermocouples 21 through 25 and from heater assembly 19 may extend therethrough and still maintain a pressure tight housing. Also a packing gland 32 located in a wall of tray 16 allows said heater assembly conductors to pass therethrough without loss of the ice or ice water contained thereby. Furthermore, a support 33 is shown as supporting heater assembly 19—with or without material 28 mounted thereon—which is optional, depending on operational circumstances and the size, weights, and geometrical configurations of the elements involved at the time.

Housing 14 is shown as being made with its left end plate 34 being held in place by a plurality of screws or bolts 35 and 36. Although only two of such bolts are shown in FIG. 2, as many thereof may be used to make housing 14 pressure tight. Furthermore, appropriate gaskets 37 may be used between the mating surfaces of the housing walls, if such are necessary to maintain it in pressure tight condition while it is being pressurized.

To insure pressure tightness of housing 14, a packing gland 38 is also included in the wall thereof, so that pipe 39, which supplies the pressurized gas from supply tank 11, has a leak-proof entrance thereof.

If so desired, as previously mentioned, any conventional, suitable computer 29 may be connected to the outputs of thermocouples 21 through 25 in such manner that all of the temperatures thereof will be scanned properly and automatically, and the analog signal information obtained therefrom used to calculate and readout the thermal conductance, thermal conductivity, and thermal resistance of the material being tested in any useful terminology, in accordance with respective formulae that will be disclosed subsequently.

Referring now to FIG. 3, the aforementioned heater assembly 19 is illustrated as including a stand 41 having a base plate 42 which is suitably designed to set on the floor of tray 16. A block 43 is connected to the aforesaid stand 41 by any suitable means, such as by bolt 44 extending through holes 45 and 46 and nut 47. Block 43 contains an upper saddle 48 and a lower saddle 49 which are adapted for being tightened together by bolts 51 extending through holes 52 in upper saddle 48 into threaded holes 53 in lower saddle 49.

A separable electrical coupling 54 comprising a hollow shaft 55 having an internally threaded end 56 is firmly clamped between saddles 48 and 49 as a result of tightening bolts 51. A packing 57 is located at the bottom of threaded end 56 and a hollow, externally threaded insert 58 holds insulated electrical conductors 59 extending therethrough in place and in watertight arrangement with said shaft 55 and packing 57. The end of shaft 55 opposite the aforesaid internally threaded end 56 has a flange 61 with a flat face 62. At the same end is a nut 63 surrounding shaft 55 which, when tightened, urges flat face 62 of flange 61 against an O-ring 64 to form a watertight seal thereat.

O-ring 64 is located in a circular groove 65 located in the end of the other hollow shaft 66 portion of separable coupling 54. As suggested above, as a watertight seal is made by O-ring 64 against flange face 62, it also makes a watertight seal against groove 65 when nut 63 is tightened on threads 67. Shaft 66 likewise has a flange 68 integrally attached thereto, which has a plurality of holes 69 extending adjacent the periphery thereof.

At this time, it is perhaps noteworthy that in the preferred embodiment described herein, coupling 54 has a circular cross-section, as does heater assembly 19. On the other hand, it should be understood that any cross-sectional configuration may be used which will expedite the use of the invention for the purpose of testing any particular material or any predetermined diver wet suit.

Insulated conductor 59 also extends through the hollow of shaft 66, and it exits preferably at an insulation washer 71 having electrical lugs 72 and 73, to which the respective wires thereof are connected.

A stepped circular insulator 74, made of thermal resistant plastic laminate, or the like, has a hole 75 which, being complementary therewith, fits over the end of shaft 66 and is thereby centered thereon. Insulator 74 likewise has a circular groove 76 in which another O-ring 77 is disposed in such manner as to abut against the flat side surface 78 of the aforesaid flange 68, thereby making a watertight seal thereat when flange 68 and insulator 72 are urged together by screws 79 being tightened in threaded holes 81 thereof.

A metal tube 82, preferably made of aluminum or some other material which facilitates the conduction of heat therethrough, is telescoped over an O-ring 83 located in groove 84 in the smaller diameter step of stepped circular insulator 74 and also abuts the flat side surface of the flange portion thereof. Screws 84 extend through holes 85 in insulator 72 and into threaded holes 86 in said metal tube 82, and when tightened, firmly hold one against the other.

As was mentioned previously and will be discussed in greater detail subsequently in conjunction with FIG. 4, a plurality of thermocouples 21 through 24 (22 and 23 not shown in FIG. 3) are suitably spaced around the circumference and along the length of tube 82. Actually, they are disposed in milled axial slots or grooves 87 through 91, respectively, and their respective insulated conductors extend therealong to any appropriate exits, from which they travel to the aforesaid selector switch 26 of FIGS. 1 and 2. Heat conductive potting material 92, such as an aluminum filled epoxy putty, covers both said conductors and thermocouples in such manner as to hold them in place. Of course, when hard, said putty is dressed off flush with the probe or tube surface, so as to offer the least thermal disturbance thereat.

The heating element consists of approximately thirty feet of electrically insulated 20 gauge nickel-chromium resistance wire 94, with the ends thereof electrically connected to the aforesaid lugs 72 and 73, which, as previously indicated, receive electrical energy from insulated conductor 59. The electrical insulation of wire 94 is preferably made of asbestos covered with a monel braded sheath, but, of course, it may also be of any other conventional suitable insulative material. Wire 94 is helically wound on a grooved mandrel 95, which is telescopically inserted in tube 82. Mandrel 95 and helical wound heating wire 94 should be of such outside diameters that the outside diameter of the helix is complementary with the inside diameter of tube 82 and in contact therewith, thereby forming a good heat conductive path therebetween.

At the other end of heater assembly 19 is a stepped end cap 96, the smaller diameter step 97 of which is telescopically inserted in the end of tube 82. Within a groove 98 extending around step 97 is an O-ring 99 that abuts against the inside diameter of tube 82, thereby forming a watertight seal thereat.

At this time, it would appear to be noteworthy that all of the O-rings used in this invention are of such material and strength that they can withstand the operational pressures to which they are subjected during any given material test operations. Moreover, if necessary, it should be understood that gaskets of any appropriate type may be used in the invention, too, so as to make all of the mating surfaces of the entire invention pressure and/or watertight, respectively, during any given operational circumstances.

Screws 101 extending through holes 102 in end cap 96 and into threaded holes 103 in the end of tube 82 hold end cap in place which, in turn, causes heating element mandrel 95 to be held in place within said tube 82.

A removable inspection plug 104 having external pipe threads is screwed into a complementary threaded inspection hole 105 in the center of cap 96 in such manner as to make a pressure tight and watertight seal thereat.

Referring now to FIG. 4, there is shown an enlarged view of the aforementioned thermocouple arrangement, as the thermocouples thereof are mounted within slots 87 of tube 82. For the sake of simplicity of disclosure, inasmuch as all such arrangements are similar, only thermocouple 21 and associated structure will be discussed. Each of said thermocouples is disposed any place on tube 82 that will enable it to take the temperature of the outer surface thereof at any desired location; accordingly, the electrical wires or leads 106 thereof are located in groove 87 as necessary to extend to any suitable exit thereof and be connected to selector switch 26. Thus, it may be seen that they, too, are potted within potting material 92. Said lead wires preferably exist at a common external exit, but, if so desired, they may be extended through mandrel 95 and extend through the same connector which heater lead wires 59 extend. Obviously, although not shown in the drawing, it would be well within the capabilities of the artisan to make such construction, if he had the teachings presented herein.

THEORY OF OPERATION

The thermal conductance of a material may be calculated for any given ambient pressure by the following classical formula disclosed at page 3 of the 1966 Book of ASTM Standards, published by the American Society for Testing and Materials, Philadelphia, Pa.:

$$C = \frac{q}{A(t_1 - t_2)} \quad (1)$$

where:

C=thermal conductance, in B.t.u. per hr. sq. ft. deg. Fahr.,
q=time rate of heat flow, in B.t.u. per hr.,
A=effective area measuring on a selected isothermal surface, in sq. ft.,
$t_1$=temperature of the hot surface, in deg. Fahr.,
$t_2$=temperature of the cold surface, in deg. Fahr.

The effective area A may be calculated for a hollow cylinder as follows:

$$A = \frac{A_o - A_i}{\ln(A_o/A_i)} \quad (2)$$

where:

A=the effective area of the tested material in sq. ft.,
$A_o$=the outside area of the tested material in sq. ft.,
$A_i$=the inside area of the tested material in sq. ft.
ln=the natural logarithm.

In making the aforementioned calculations with the invention, it has been found that both the contract resistance and the water side-film resistances are small enough to be negligible and, therefore, they may be neglected.

In the event it is desired to calculate the thermal conductivity of tested sample materials, the following formula may be used:

$$K = CL \quad (3)$$

where:

K=thermal conductivity, in B.t.u. in. per hr. sq. ft. deg. Fahr.,
C=the thermal conductance calculated from Formula 1,
L=thickness of the material specimen measured along a path normal to isothermal surfaces, in inches.

For convenience in analyzing the efficiency of tested materials, it is sometimes desirable to know the thermal resistance thereof. Accordingly, it may be calculated from the formula:

$$TR = \frac{1}{C} \quad (4)$$

where:

TR=thermal resistance, in deg. Fahr. hr. sq. ft. per B.t.u.,
C=thermal conductance calculated from Formula 1.

MODE OF OPERATION

The operation of the subject invention will now be discussed briefly in conjunction with all of the figures of the drawing.

The material to be tested should preferably have the geometrical configuration that allows it to be slipped over or wrapped around the heater assembly and be in contact therewith. The snugness of the fit should also preferably simulate that which occurs during actual service thereof. Thus, if a wet suit is being tested, an arm thereof may be slipped over the heater assembly 19, while the rest of the suit lays in housing 14 (which, of course, should be large enough to accommodate such a suit or other device being tested). The heater assembly is then placed in ice water bath 18 in tray 16, and tray 16 set in housing 14. Housing 14 is then made pressure tight by installing and tightening end plate 34.

Electrical energy is supplied to heater assembly 19 by regulated D.C. power supply 20, which causes tube 82 to be warmed up to a given temperature—ordinarily comparable to normal body temperature—which is sensed by thermocouples 21 through 24 and indicated and/or recorded by readout 27. Selector switch 26 is used to readout any one of said thermocouples or all thereof as desired, and thereby produce a temperature reading that is defined as $t_1$ in the aforementioned Formula 1. Consequently, this $t_1$ temperature indicates the simulated body temperature that would occur if a wet and/or dry suit made thereof were being used by a swimmer or diver in freezing water. The readout of thermocouple 25 effectively indicates the outside ambient water temperature (simulated by ice water bath 18) and is defined as $t_2$ in the aforementioned Formula 1.

As is well known among swimmers and divers who wear protective suits, a wet suit is one that allows a small amount of water to accumulate between the inside of the suit and the skin of the diver. Body heat warms this water very quickly and it, as well as the suit itself, acts as an insulator between the cold water in which he is swimming and his body. This is, of course, only mentioned because the subject invention simulates this condition and thereby enables the actual body heat loss to be measured more accurately at various water depths and pressures, rather than just measuring the heat transfer through the material—although that is possible, too.

Once the system has reached substantial equilibrium at the temperature desired, gas from regulated gas supply 11 is fed through pressure regulator valve 12 into housing 14. This housing pressure is measured and indicated by gauge 13, so it is always known; and this pressure is thus automatically applied to the entire outside surface of the material being tested. As the applied pressure increases, the material is compressed; and as a result of such compression, the heat insulation ability thereof is decreased, especially if said material is of the sponge or foam type.

From the temperature readings taken at various pressures, the thermal conductance, thermal conductivity, and thermal resistance values of any material, including that of a wet suit, may be calculated and plotted either manually or by computer 29 as a curve or family of curves for one or more sample materials, as is depicted graphically in FIG. 5. Hence, the relative merits of each is readily available, and the proper selection thereof for any given purpose is facilitated.

FIG. 5 shows the thermal conductance of four representative material samples which were tested at various absolute atmospheric pressures. As may be seen, in two samples (A and B), thermal conductanue increased rapidly with pressure; therefore, the test thereof was discontinued at approximately seven atmospheres, and they were discarded. Two other samples (C and D) faired better all the way to seventeen atmospheres, and one (D) thereof did very well, indeed. Thus, it was easy to select the D material for its intended purpose, namely for the making of a wet suit that would allow only low body heat loss at great water depths. Obviously, a diver wearing a suit of such material would be much safer in cold water than he would be if he were wearing a suit of the other materials.

From FIG. 5, it may readily be seen that the subject invention makes a very valuable contribution to the wet (and/or dry) suit testing art, and, in particular, constitutes a considerable improvement in temperature-pressure testing of compressible and/or non-compressible materials, be they in the form of wet suits or otherwise.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope thereof.

What is claimed is:
1. A system for testing the thermal characteristics of a material at various pressures within a simulated operational environment, comprising in combination:
   housing means capable of being pressurized a predetermined amount by a fluid;

a tray means disposed within said housing means for containing an ice water bath therein;

heater means submerged within the ice water bath contained by said tray means, said heater means adapted for heating the inside surface of the aforesaid material when it is slipped thereover to a predetermined temperature in response to electrical energy supplied thereto;

means contiguously disposed with the outer surface of said heater means for sensing the temperature thereof and effectively sensing the inside surface of said material;

means disposed within the ice water bath in said tray means for sensing the temperature thereof;

means connected to said heater means for supplying a known amount of electrical energy thereto;

means connected to each of said temperature sensing means for selectively reading out the temperatures sensed thereby; and means connected to the aforesaid housing means for supplying said fluid thereto in such manner as to effect the pressurization thereof a predetermined amount.

2. The system of claim 1, wherein said material incorporates a resilient cellular structure, the cells of which include a fluid.

3. The system of claim 1, wherein said material comprises foamed neoprene.

4. The system of claim 1, wherein said material is that of a swimmer-diver wet suit.

5. The system of claim 1, wherein said heater means comprises:

a mandrel having a helical groove located in the outside surface thereof and along the length thereof;

a nickel-chromium heating wire wrapped around said mandrel in such manner as to be mounted in the helical groove thereof;

a metallic tube disposed around said mandrel and heating wire with a fit that is sufficiently snug that the inside diameter of said metallic tube is in contact with said heating wire;

an insulating end cap, having a hole extending therethrough, attached to one end of said metallic tube for closure thereof in watertight configuration at substantially the periphery thereof;

a metallic end cap attached to the other end of said metallic tube for closure thereof in watertight configuration;

separable insulated electrical connector means attached to said insulating end cap in such manner as to provide a watertight configuration around the hole extending therethrough;

electrical conductor means effectively extending through said separable insulated electrical connector means and the hole of said insulating end cap and connected to the ends of the aforesaid heating wire for supplying electrical energy thereto to effect the heating thereof;

packing gland means mounted in the end of said separable insulated electrical connector means opposite to the end thereof connected to said metallic tube for effecting a watertight seal thereat.

6. The invention of claim 1 further characterized by means releasably connected to said heater means for the support thereof at a predetermined attitude and position within the ice water bath contained by said tray.

7. The system of claim 1, wherein each of the temperature sensing means thereof is a thermocouple.

8. The system of claim 1, wherein said means connected to said heater means for supplying a predetermined amount of electrical energy thereto comprises an adjustable regulated direct current power supply.

9. The system of claim 1, wherein said means connected to each of said temperature sensing means for selectively reading out the temperatures sensed thereby comprises:

a selector switch; and a temperature readout.

10. The system of claim 1, wherein said means connected to each of said temperature sensing means for selectively reading out the temperature sensed thereby includes a computer for calculating the thermal conductance, the thermal conductivity, and the thermal resistance of the aforesaid material.

11. The system of claim 1, wherein said means connected to the aforesaid housing means for supplying said fluid thereto in such manner as to effect the pressurization thereof a predetermined amount comprises:

a pressurized gas supply;

an adjustable pressure regulator valve connected between the output of said pressurized gas supply and an input of said housing; and a pressure gauge effectively connected to the output of said adjustable pressure regulator valve for constantly indicating the pressure within the aforesaid housing.

References Cited

UNITED STATES PATENTS 2,484,736   10/1949   Razek _____ 73—15

JAMES J. GILL, Primary Examiner

H. GOLDSTEIN, Assistant Examiner